F. J. BEIER.
APPARATUS FOR POPPING CORN.
APPLICATION FILED APR. 9, 1915. RENEWED JAN. 7, 1922.
1,431,438.
Patented Oct. 10, 1922.
4 SHEETS—SHEET 1.
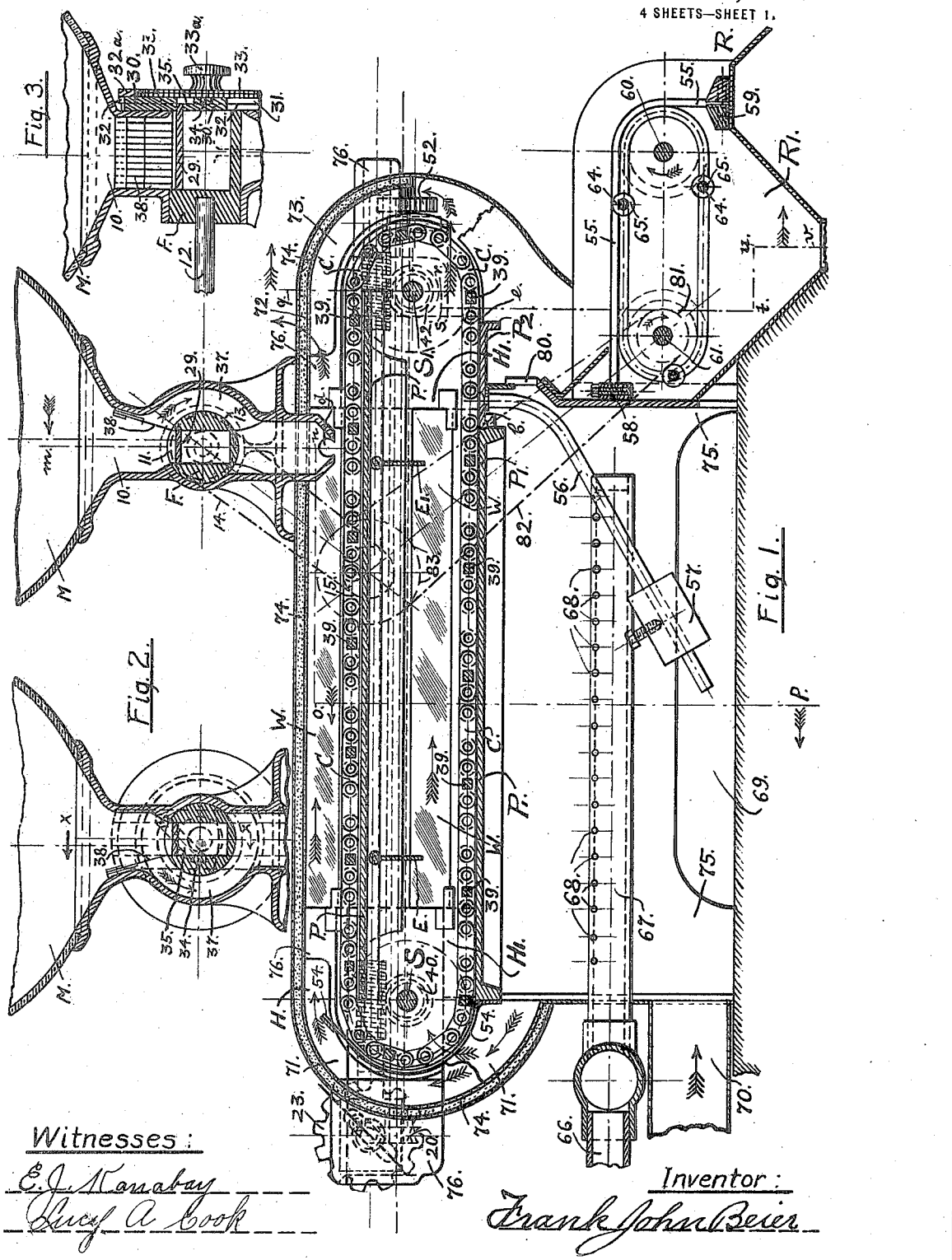

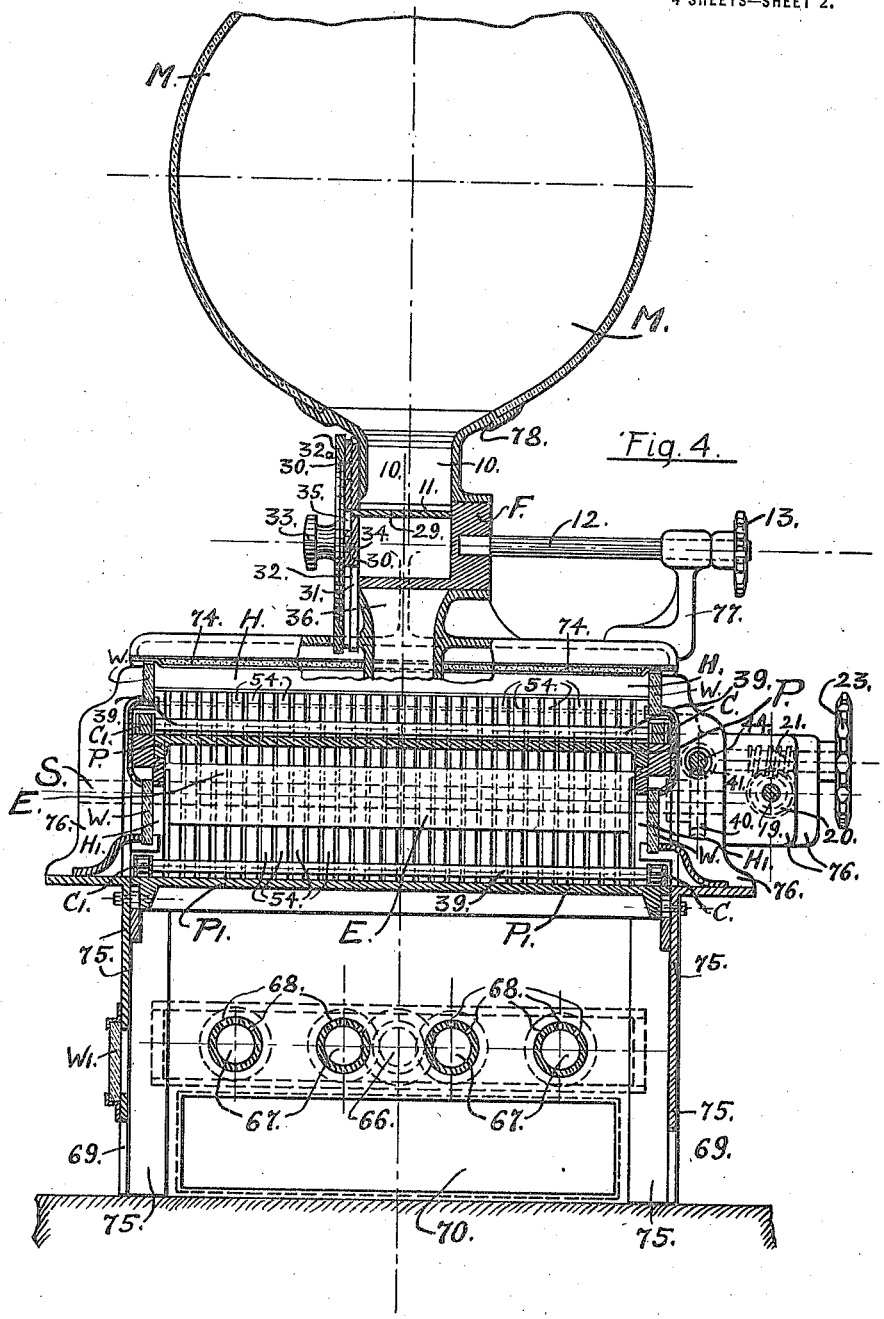

F. J. BEIER.
APPARATUS FOR POPPING CORN.
APPLICATION FILED APR. 9, 1915. RENEWED JAN. 7, 1922.
1,431,438.
Patented Oct. 10, 1922.
4 SHEETS—SHEET 3.
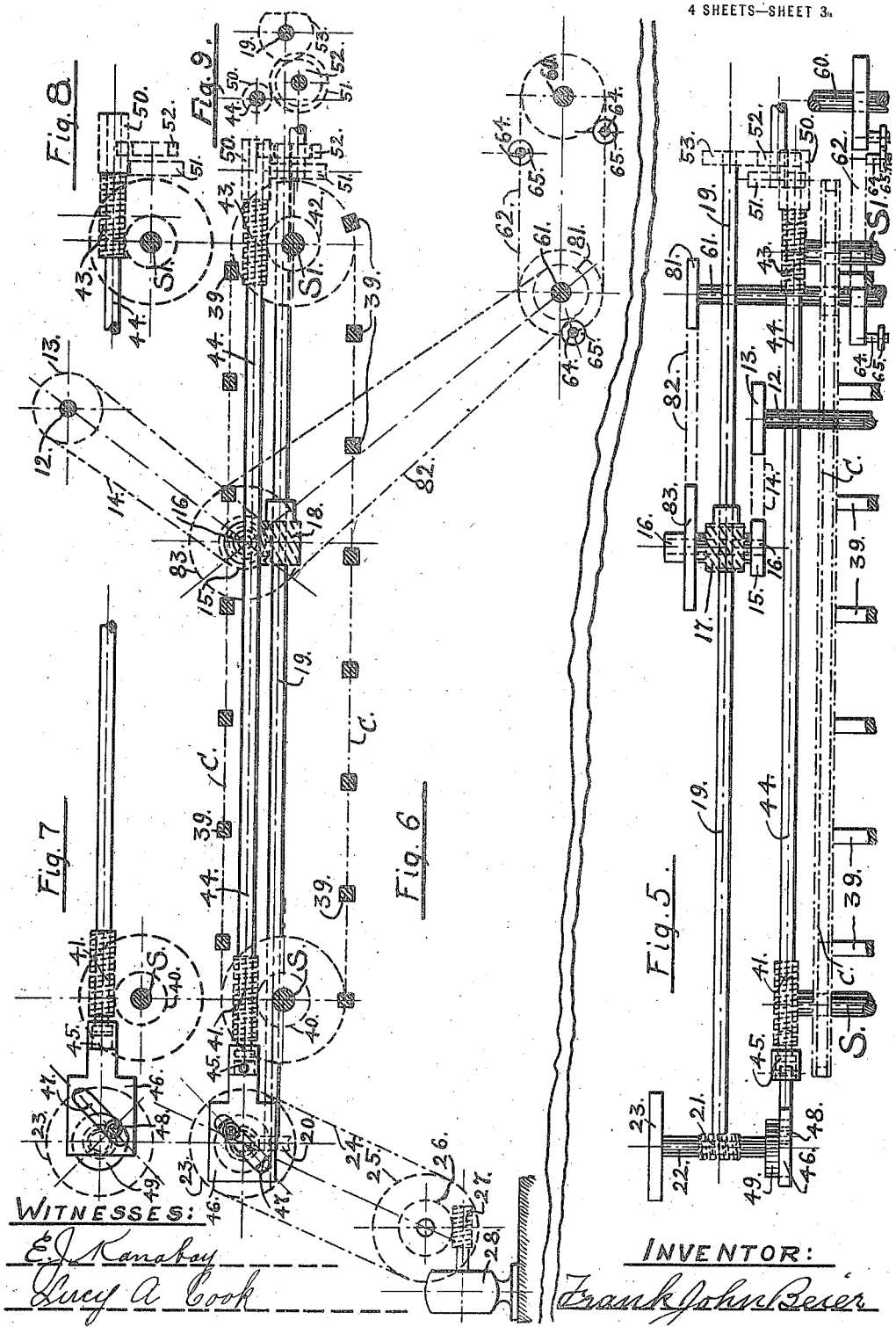
WITNESSES:
E. J. Kanabay
Lucy A. Cook
INVENTOR:
Frank John Beier Patented Oct. 10, 1922.

1,431,438

UNITED STATES PATENT OFFICE.

FRANK JOHN BEIER, OF CHICAGO, ILLINOIS, ASSIGNOR TO THE SHOTWELL MANUFACTURING COMPANY, OF CHICAGO, ILLINOIS, A CORPORATION.

APPARATUS FOR POPPING CORN.

Application filed April 9, 1915, Serial No. 21,480. Renewed January 7, 1922. Serial No. 527,778.

*To all whom it may concern:*

Be it known that I, FRANK J. BEIER, a citizen of the United States of America, and resident of the city of Chicago, in the county of Cook and State of Illinois, have invented a new, useful, and improved Apparatus for Popping Corn, of which the following is a description, reference being had to the accompanying drawings, forming a part of this specification, in which similar letters and numerals of reference in the several figures refer to similar parts.

This invention relates to an apparatus for popping corn, and comprises means for feeding the corn from a mass at a predetermined rate; means, including a relatively short, stationary heating plate, for enclosing a preheating region; means, including a second relatively short stationary heating plate, for enclosing a popping region; means for heating the said plates; means for guiding the corn from the heating region to the popping region; means for conveying the corn from the points where it is received from the feeder through the said heating and popping regions to a place of discharge; means for agitating the corn as it is passing through the heating region and the popping region and for causing it to be retained, under agitation, for a relatively long period of time, in the said regions while it is traveling from the points where it is introduced to the said place of final discharge; means for insuring the escape of the corn after popping, in unbroken condition; and means for separating the popped from the unpopped corn.

In the drawings:

Fig. 1 is a vertical, longitudinal section through the main parts of my popping apparatus.

Fig. 2 is a vertical section of the corn feeding device looking in the direction opposite to that in which the parts shown in Fig. 1 are seen.

Fig. 3 is a vertical section through a part of Fig. 2, on the line $x$—$x$ looking in the direction indicated by the arrows.

Fig. 4 is a vertical cross section of the apparatus on the broken line $m$—$n$—$o$—$p$ of Fig. 1, looking in the direction of the arrows shown near $m$ and $p$, parts being broken away.

Fig. 5 is a plan of a part of one form of mechanism employed for the operation of the apparatus.

Fig. 6 is a side view of the main parts of the said mechanism.

Figs. 7 and 8 illustrate parts of said mechanism in another position.

Fig. 9 is an end view of parts shown in Fig. 6.

Figure 10:
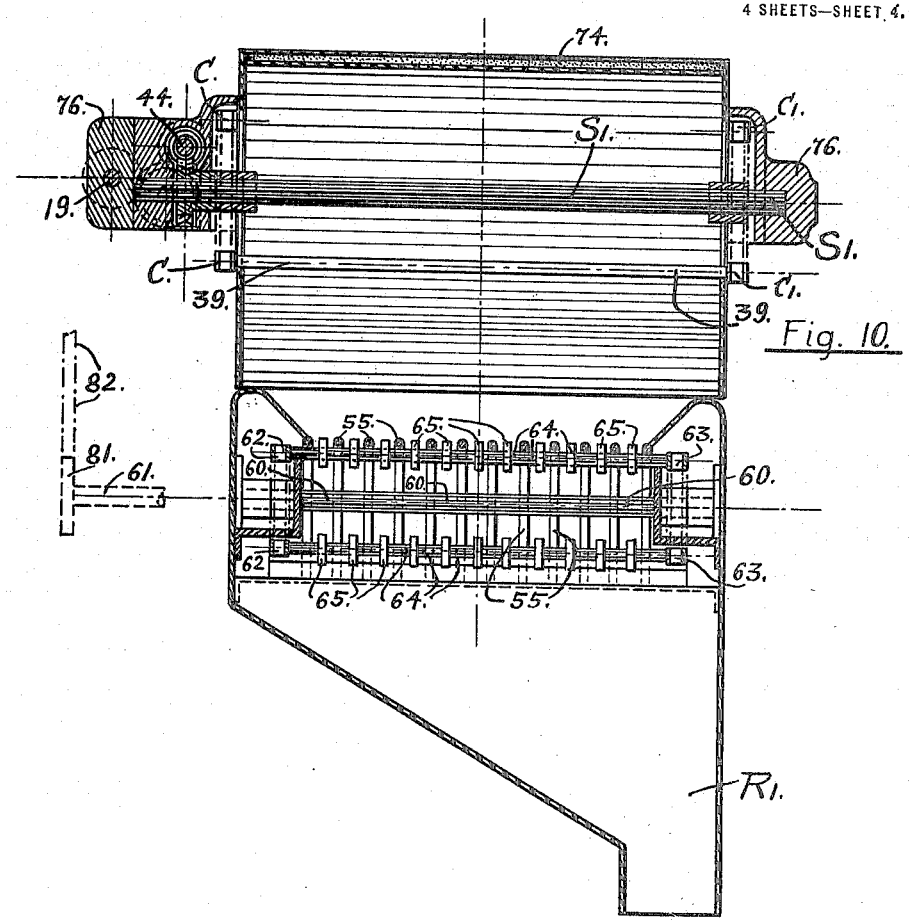
Fig. 10 is a vertical cross section through the apparatus on the broken line $q$—$r$—$s$—$t$—$u$—$v$ of Fig. 1, looking in the direction of the arrows shown near $q$ and $v$.

M is a magazine for corn, shown in the form of a glass bowl, which may be provided with a suitable lid at its top and a discharge opening 10 at its bottom. This opening 10 leads into a feeding chamber 11, provided in the partly cylindrical corn feeder F. The latter is connected by means of a shaft 12, a sprocket wheel 13, a chain 14, a sprocket wheel 15, a shaft 16, spiral gears 17 and 18, a shaft 19, a worm-gear 20, 21, a shaft 22, a sprocket wheel 23, a chain 24, a sprocket wheel 25 and a worm-gear 26, 27 to a motor 28. In the feeding chamber 11 is adjustably arranged a plate 29 rigidly connected to a plate 30 constructed to slide in a slot 31 formed between and by plates 32, rigidly connected to a ring $32^A$ supporting in its center part a rotatable disk 33 provided with a handle $33^A$ and carrying eccentrically a pin 34 engaging with a slot 35 cut into the plate 30 and being inclined preferably at an angle of 45 degrees relatively to the slot 31. By turning the handle $33^A$ (by hand) with its disk 33 and the pin 34 relatively to the ring $32^A$ and the plates 32, the plates 30 and 29 move relatively to the horizontal center line of the corn feeder, F, and thus the feeding chamber 11 becomes either larger or smaller at will of the operator who has thereby a means of adjusting the amount of corn fed during each revolution of the shaft 12 from the magazine M through a conduit 36 into a heating chamber H. The rotary corn feeder F is intended to rotate in the direction indicated by arrows and is partly surrounded on one side by a canal 37 which is partly closed by small elastic wires 38 preventing the corn from dropping under the action of its gravity, through the canal 37, but allowing a passage of kernels partly within and partly without the feeding chamber 11 and thus safeguarding against a damaging of these kernels by the edges formed between the straight surfaces of the chamber 11 and the cylindrical outside of the corn feeder F. The conduit 36 is preferably provided with side openings at $d$ for facilitating a distribution of corn sideways over the heating plate P. The drawings show two heating chambers, H and $H^1$ arranged one above the other and provided at their bottoms with two heating plates P and $P^1$ respectively. S, $S^1$ indicate horizontal shafts passing transversely across the mechanism. There is a sprocket wheel at each end of each of these shafts and rigidly connected thereto. The two sprocket wheels on each of two opposite sides of the heating chambers H and $H^1$ carry in common one of two parallel sprocket chains C and $C^1$, connected one to the other by means of a plurality of agitating bars 39, 39. These bars extend across the heating chambers and are arranged to move on lines adjacent to the upper surfaces of the heating plates P and $P^1$, and in directions longitudinal thereof. The two shafts S and $S^1$ are connected by worm gears 40, 41 and 42, 43 respectively to a shaft 44 revoluble in a sleeve 45. The latter is integral with a plate 46 engaged by a slot 47 with a crank pin 48 of the crank disk 49 which is rigidly connected to and revoluble with the shaft 22 and the sprocket wheel 23. The worms 41 and 43 are so long as not to be disengaged from the gear wheels 40 and 42 respectively by a reciprocating movement of the shaft 44, this motion being effected by a revolving of the shaft 22 and by the corresponding function of the crank pin 48 in the slot 47. The reciprocating longitudinal movement of the shaft 44 and of the worms 41 and 43 effects a reciprocating rotary movement of the gear-wheels 40 and 42 and of the shafts S and $S^1$ respectively and also of the sprocket wheels rigidly connected near the ends of these shafts. In consequence, a reciprocating movement of the sprocket chains C and $C^1$ and of the agitating bars 39 is effected and with corn supplied on the plates P and $P^1$, this corn may be moved alternately in opposite directions. The shaft 44 carries also a gear wheel 50 engaging with a gear wheel 51 and made so long as not to become disengaged from the shaft 44 being reciprocated by the crank disk 49. A gear wheel 52 is secured to the shaft of the wheel 51, and engages with a gear wheel 53 carried by the shaft 19. By revolving the latter by means of the sprocket wheel 23, revolution of the gear wheels 52, 51 and 50, of the shaft 44, of the worm gears 41, 40 and 43, 42 of the shafts S and $S^1$, and of the sprocket wheels carried by these shafts is effected. In consequence and with a continuous revolving of the shaft 19 in one direction, a continuous travel of the sprocket chains C and $C^1$ with the agitating bars 39 is effected in one direction with respect to the position occupied at each moment by said chains and bars on account of their reciprocating movement as hereabove described; and the bars 39 not only effect a reciprocal agitation of corn on the heating plates P and $P^1$, but slowly move corn delivered from the corn feeder F on the upper heating plate P towards the left end of this plate, referring to Fig. 1, and after dropping the corn on the lower heating plate $P^1$, move it on the surface of the latter towards the right end thereof. Bent flat bars 54 with narrow slots between them forming passages for warm air or warm gaseous products of combustion insure the delivery of corn dropped from plate P to the surface of plate $P^1$.

The separator employed for separating the popped corn from the corn which leaves the lower heating plate $P^1$ in an unpopped state, is illustrated in Figures 1 and 11, and consists of a number of bars 55 with slots between them large enough for the passage of unpopped corn. To prevent damaging any popped kernel of the corn at the instant of its dropping over the edge of the plate below it, a light plate $P^2$ is positioned at the end of the main heating plate $P^1$ and arranged to swing downward. It is pivotally supported on a transverse horizontal axis, indicated by $b$. A rod 56 is fixed to the plate $P^2$ and is inclined therefrom across the vertical plane of the hinge axis of the plate. 57 is a weight adjustably fastened to the rod 56. When the plate is forced down the weight swings upward, and then acts to return the plate to normal position.

If any rod 39, while moving relatively backward, should engage with a kernel and press it against the plate $P^2$ the pressure will cause the downward swinging of the plate not only to a position where the pressure will be relieved but to a still lower position, and the weight 57 is correspondingly moved upward. Thus the kernel becomes free and either drops upon or through the bars 55, or it is shoved towards the upper surface of the plate $P^1$. Bars 80 limit the downward motion of the plate $P^2$. Each bar 55 has its ends, respectively, fastened within clamps 58 and 59, and a part thereof is bent in a quarter circle with a radius a little larger than the pitch radius of each of two pairs of sprocket wheels mounted on shafts 60 and 61 and carrying two sprocket chains 62 and 63, connected one to the other by means of rods 64 fastened revolubly in links of the sprocket chains and carrying disks 65 in such a way that they may enter and travel within the slots provided between the bars 55. By revolving the shaft 60 and 61 in the direction indicated by arrows, the disks 65 revolving with the rods 64, carry popped corn dropped from the plate $P^2$ on the bars 55, towards a receptacle located at R while the unpopped corn drops from the plate P² through the slots provided between the bars 55 into the bottom of a funnel R¹. Rotation of the shafts 60 and 61 is effected by means of the sprocket chains 62, 63 and 82, the sprocket wheel 81 and the sprocket wheel 83 mounted on the shaft 16. 66 is a supply pipe for fluid fuel, preferably for combustible gas, and communicates with a plurality of fire tubes 67, 67 provided with apertures 68, 68 for the outflow of the fuel. The fire tubes 67, 67 are located below the heating plate P¹. Air for burning the fuel may be supplied through openings 69, 69 or in case the whole apparatus is enclosed in a casing, preferably with transparent (glass) walls, the required air may be supplied through a canal 70, with walls extending through the walls of said casing. The latter is not shown, not being a part of this invention, and its application is understood by any mechanic. The flame produced by burning the gas issuing from tubes 67, 67, heats the plate P¹ and the resulting gaseous products of combustion flow through the canal 71 partly through slots between the bars 54, into the lower heating chamber H¹ and partly past these bars 54 into the upper heating chamber H from which they may escape through an opening 72 shown in dotted lines in Fig. 1. Also products of combustion may escape from the heating chamber H¹ through a passage 73 and the opening 72 after having imparted heat to the underside of the heating plate P. The canal 71, the upper heating chamber H and the passage 73 are preferably provided with a heat insulating wall 74. A part of the side walls of the heating chambers H and H¹ is preferably made transparent and may consist of glass W. Also a transparent wall W¹ may be provided for the inspection of the fire above the tubes 67, 57. Suitable supports 75, 76, 77 and 78 carry the whole apparatus and the several parts of employed machinery and also protect these parts from incidental outside interference and damage. A light plate E or two light plates E and E¹ may be provided in the lower heating chamber H¹ and pivotally supported at their upper parts for checking the jumping of the popping corn without interfering with its agitation and conveying. Instead of producing the required heat by a flame or flames, an electric current may be employed for this purpose.

The apparatus operates as follows:

With corn supplied to the magazine M the heating of the plates P and P¹, or P³ may begin according to the kind of plates employed, by means of a flame or by means of electricity and as soon as the heating plates become warm, the motor 28 or any suitable source of motion may start to rotate the sprocket wheel 23, and to move all mechanical parts connected therewith as described. Corn is now supplied from the magazine M to the upper heating chamber H and under constant agitation preparatorily heated. Simultaneously the corn is conveyed towards the lower heating chamber H¹, where it is heated to the popping temperature, and under constant agitation conveyed towards the separator bars 55, 55 where the popped corn is separated from the unpopped. The latter drops into the hopper R', and the former is delivered to a suitable receptacle positioned at R.

The kernels are cold when they are fed to the upper plate. It is necessary to heat each of the kernels to a comparatively high degree, to distribute the heat uniformly through each, and to heat all of the kernels uniformly. To accomplish the first object they should be retained in the pre-heating region for a considerable period of time and brought more or less gradually to the high popping temperature. If they are, from the instant of entry, advanced continuously through the pre-heating region, their path of transit must be greatly elongated. They must be kept in constant agitation upon the heating surface. That is, they must have a rapid movement relative to that surface. By providing, as I do, means which positively engage with the kernels and move them relatively backward on the pre-heating plate, and then move them relatively forward, I secure a more or less rapid and violent agitating and rolling of the kernels without rapidly advancing them toward the delivery end. I accomplish all of these purposes in a small horizontal area, the heating plates being only eight or ten inches in length. If chain supported bars, or equivalent positively-acting kernel-engaging devices are used they can be caused to advance the kernels as short a distance as one-sixteenth of an inch for each cycle, although the total distance traveled during each reciprocation is much greater.

I claim:

1. In a mechanism of the class described, the combination with the popping plate, the means for heating it, and the means for supplying corn thereto, of the bars arranged transversely to the top surface of the plate, means for continuously advancing the bars, and devices for reciprocating the bar-advancing means while said bars are advancing.

2. In a mechanism of the class described, the combination with the popping plate, the means for heating it and the means for supplying corn thereto, of the endless chain carrier having cross bars attached thereto which are closely adjacent to the top surface of the popping plate, and which are advanced by the chain along said plate, and means for reciprocating the chain bodily while it is advancing the bars.

3. In a mechanism of the class described, the combination with the popping plate, the means for heating it and the means for supplying corn thereto, of means which travel in one direction from the feed end of the plate to the delivery end and engage with the corn kernels on the plate while so traveling, and devices for intermittingly moving backward said kernel engaging means.

4. In a mechanism of the class described, the combination with the popping plate, the means for heating it, and the means for supplying corn thereto, of devices engaging with the kernels on the plate and adapted to move them forward a predetermined distance relatively to the lines of advance of the plate, and to then move them backward a lesser predetermined distance relatively thereto, said devices advancing bodily in one direction.

5. In a mechanism of the class described, the combination with the popping plate, the means for heating it, and the means for supplying corn thereto, of kernel-engaging cross bars immediately above the popping plate which reciprocate longitudinally of the plate and bodily advance while reciprocating.

6. In a mechanism of the class described, the combination with the popping plate, the means for heating it and the means for supplying corn thereto, of kernel engaging cross bars adapted to travel immediately above the popping plate, means for carrying said bars continuously through a cycle of movement, and means for imparting to the said bars a plurality of reciprocatory cycles of movement while they are traveling through the main movement cycle.

7. In a mechanism of the class described, the combination with the popping plate, the means for heating it, and the means for supplying corn thereto, of the kernel-engaging cross bars arranged to travel immediately above the plate, means for moving said bars bodily from end to end of the said plate, and means for intermittingly causing each of said bars to move relatively backward during the period of its travel from end to end of the plate.

8. In a mechanism of the class described, the combination of the stationary horizontal popping plate, the stationary pre-heating plate, the endless agitating and advancing means having corn engaging devices which travel continuously first on lines adjacent the upper surface of the popping plate and then on lines adjacent the upper surface of the pre-heating plate, whereby the corn while being agitated is advanced uniformly at a predetermined rate over all parts of both plates by the the same corn engaging devices.

9. In an apparatus of the class described, the combination of the stationary horizontal popping plate, the stationary horizontal pre-heating plate, the agitating and advancing means comprising endless chains, cross bars arranged to travel on lines adjacent the upper surfaces of the said plates successively, the chain supporting and guiding devices, and means for reciprocating the chain supports longitudinally of the plates.

10. In a mechanism of the class described, the combination with the casing, the stationary popping plate, the stationary pre-heating plate, and the means traveling continuously along the surface of the pre-heating plate and then along the surface of the popping plate to agitate and propel the corn, of the curved corn guide having its operative surface at the lower end coinciding with the surface of the popping plate and adapted to conduct corn from the pre-heating plate without obstruction to the popping plate.

11. In a mechanism of the class described, the combination of the casing, the stationary popping plate, the stationary pre-heating plate and the corn advancing and agitating mechanism, of the curved chute receiving the corn from the pre-heating plate and having its corn engaging face arranged to conduct the corn in contact therewith directly to the popping plate, and means for delivering currents of heated air or gas between said chute and the end wall of the casing, and conduct it to the region above the pre-heating plate.

12. In a mechanism of the class described, the combination of the casing, the stationary popping plate, the stationary pre-heating plate, the heating chamber below the popping plate adapted to contain volumes of hot air or gas, the flue or duct for hot air and gas extending from the said chamber around the receiving end of the popping plate and the delivery end of the pre-heating plate, and the guide for corn which conducts it from the end of the pre-heating plate and delivers it to the upper surface of the popping plate.

13. In a mechanism of the class described, the combination with the stationary popping plate, the endless carrier having cross bars traveling near the plate, and the means for moving the cross bars backward while the chains are advancing them, the plate at the end of the popping plate arranged to have the corn kernels pass over it and adapted to automatically swing downward to permit the escape of kernels when engaged by the backward moving cross bars.

FRANK JOHN BEIER.

Witnesses:
 FRANK J. SMITH,
 LUCY A. COOK.